United States Patent
Dettinger et al.

(10) Patent No.: US 7,496,916 B2
(45) Date of Patent: Feb. 24, 2009

(54) SERVICE AND RECOVERY USING MULTI-FLOW REDUNDANT REQUEST PROCESSING

(75) Inventors: Richard D. Dettinger, Rochester, MN (US); Frederick A. Kulack, Rochester, MN (US); Richard J. Stevens, Mantorville, MN (US); Eric W. Will, Oronoco, MN (US)

(73) Assignee: International Business Machines Corporation, Armonk, NY (US)

( * ) Notice: Subject to any disclaimer, the term of this patent is extended or adjusted under 35 U.S.C. 154(b) by 892 days.

(21) Appl. No.: 10/666,899

(22) Filed: Sep. 18, 2003

(65) Prior Publication Data

US 2005/0066327 A1 Mar. 24, 2005

(51) Int. Cl.
  *G06F 9/46* (2006.01)
  *G06F 11/00* (2006.01)
  *G06F 15/16* (2006.01)
  *G06F 15/00* (2006.01)
  *G06F 9/44* (2006.01)

(52) U.S. Cl. .................... 718/100; 714/4; 714/51; 714/57; 712/218; 712/239; 709/203; 709/223

(58) Field of Classification Search ............... 714/47, 714/4, 43, 51–57; 718/100–108; 709/201–227; 712/218–239
See application file for complete search history.

(56) References Cited

U.S. PATENT DOCUMENTS

| | | | |
|---|---|---|---|
| 6,148,368 A * | 11/2000 | DeKoning | 711/113 |
| 6,185,695 B1 * | 2/2001 | Murphy et al. | 714/4 |
| 6,298,455 B1 * | 10/2001 | Knapman et al. | 714/43 |
| 6,539,494 B1 * | 3/2003 | Abramson et al. | 714/4 |
| 6,542,920 B1 * | 4/2003 | Belkin et al. | 718/104 |
| 6,560,717 B1 * | 5/2003 | Scott et al. | 714/4 |
| 6,687,847 B1 * | 2/2004 | Aguilera et al. | 714/4 |
| 6,725,227 B1 | 4/2004 | Li | |
| 6,772,363 B2 * | 8/2004 | Pedone et al. | 714/4 |
| 6,775,687 B1 * | 8/2004 | Binding et al. | 709/203 |
| 6,779,028 B1 * | 8/2004 | Nakamura | 709/223 |
| 6,854,075 B2 * | 2/2005 | Mukherjee et al. | 714/51 |
| 6,859,834 B1 * | 2/2005 | Arora et al. | 709/227 |
| 6,961,935 B2 * | 11/2005 | Torii | 718/100 |
| 6,985,975 B1 * | 1/2006 | Chamdani et al. | 710/55 |
| 7,146,544 B2 * | 12/2006 | Hsu et al. | 714/57 |
| 2001/0037447 A1 * | 11/2001 | Mukherjee et al. | 712/239 |
| 2003/0046615 A1 * | 3/2003 | Stone | 714/47 |
| 2003/0187995 A1 * | 10/2003 | Fok et al. | 709/227 |
| 2004/0154017 A1 * | 8/2004 | Emma et al. | 718/100 |
| 2005/0050304 A1 * | 3/2005 | Mukherjee et al. | 712/218 |

FOREIGN PATENT DOCUMENTS

WO    WO 99/57620    * 11/1999

* cited by examiner

*Primary Examiner*—Meng-Ai An
*Assistant Examiner*—Jennifer N To
(74) *Attorney, Agent, or Firm*—Patterson & Sheridan, LLP (57) ABSTRACT

Methods, systems and articles of manufacture for performing multiple request processing. Redundant instances of executing entities service requests in a time-delayed fashion, relative to one another. In this way, a user can be returned to an earlier state by switching to the execution flow of one of the other executing entities.

8 Claims, 12 Drawing Sheets

AN ERROR HAS OCCURED PROCESSING REQUEST " #32 - RUN THE CURRENT QUERY"

THE ERROR IS :
   JAVA.LANG.NULLPOINTEREXCEPTION

CHOOSE ONE OF THE FOLLING ACTIONS:

1302 —— ☐ RETRY FROM THE SELECTED REQUEST
1304 —— ☐ REPLAY FROM THE SELECTED REQUEST

SELECT A LOCATION :

1306 {
  ☐ # 27 - ADDCONDITION DIAGNOSIS DATE IS LESS THAN 01/01/1970
  ☐ # 15 - STEP 15
  ☐ # 1  - LOGIN USER JSMITH
}

ENABLE THESE FEATURES DURING EXECUTION :

1308 {
  ☐ COLLECT SERVICE INFORMATION ( TURN ON TRACING )
  ☐ DUMP APPLICATION STATE AND REQUEST OBJECTS
  ☐ DEBUG APPLICATION
}

1312 —[ IGNORE AND CONTINUE ]    1310 —[ RECOVER USING THESE OPTIONS ]

THE ERROR HAS BEEN RECREATED FOR REQUEST "#32 - RUN THE CURRENT QUERY"
THE CURRENT RECOVERY AND DEBUG FEATURES HAVE BEEN DISABLED AND THE
DEBUG DATA HAS BEEN STORED.

THE ERROR IS :
    JAVA.LANG.NULLPOINTEREXCEPTION

CHOOSE ONE OF THE FOLLING ACTIONS:

1302 — ☐ RETRY FROM THE SELECTED REQUEST
1304 — ☐ REPLAY FROM THE SELECTED REQUEST

SELECT A LOCATION :

1306 ⎰ ☐ # 27 - ADDCONDITION DIAGNOSIS DATE IS LESS THAN 01/01/1970
    ⎱ ☐ # 15 - STEP 15

ENABLE THESE FEATURES :

1308 ⎧ ☐ COLLECT SERVICE INFORMATION ( TURN ON TRACING )
    ⎨ ☐ DUMP APPLICATION STATE AND REQUEST OBJECTS
    ⎩ ☐ DEBUG APPLICATION

1310 — [ RECOVER USING THESE OPTIONS ]

1312 — [ IGNORE AND CONTINUE ]

SERVICE AND RECOVERY USING MULTI-FLOW REDUNDANT REQUEST PROCESSING

BACKGROUND OF THE INVENTION

1. Field of the Invention

The present invention generally relates to data processing and more particularly redundant request processing.

2. Description of the Related Art

In the context of a computerized environment, applications perform a variety of functions. Well known uses for applications include word processing, servicing Web requests, generating queries to be issued against databases, performing business transactions and the like.

In a typical application, a request (e.g., a user request) is received by an action router (event handler). Based on the data included with the user request the action router determines which function of the application (the "application action function") will handle the user request. In some cases the application action function calls a user interface renderer to display the appropriate output to the user. Throughout the processing of the request the application maintains state information. State information is the information that the application builds and uses during request processing. Such information includes application variables and their values for tracking who the user is, what they are doing and what they can do next during subsequent processing. For example, state information may include (but is not limited to) a user identification (ID) and password that the user authenticates with, the visual representation of a current user interface being presented to the user (e.g., whether the interface is terse or verbose, the absence or presence of a taskbar, and other preferences), contents of a shopping cart, and the history of user requests.

The foregoing generally describes the processing performed by an application. Of course, variations exist between applications. Some differences between applications may be characterized as differences in complexity. For example, Web applications are relatively unique in that, with respect to other applications, they have a more well restricted and encapsulated definition of their flow (as viewed from outside the application). A Web application's flow can be completely articulated by a series of requests for Uniform Resource Locators (URLs) and parameters passed on those requests that a client makes. Other applications may require more complex and encompassing representations to fully articulate the flow through the application. For example, application memory and register contents may need to be described in addition to the Application Program Interface (API) calls and parameters passed by the application.

In any case, all applications inevitably encounter errors. The possible source of these errors is highly varied, thereby making it difficult for users to take appropriate corrective action (if any corrective action is possible). The process of identifying the source of errors (and in some cases correcting errors) in applications is referred to as debugging. Debugging generally refers to a variety of techniques for addressing errors. Well-known debugging techniques include tracing, dumping and specific error handling/recovery. Tracing is useful in addressing consistent logic errors and user errors in application flow and, as such, may be a good solution for a broad category of problem determination and service. Typically, tracing is used in a fashion that allows the tracing facility to be turned on by the user when requested (i.e., end the application and restart it with tracing turned on), or by tracing information after an unexpected error occurs.

Dumping is performed upon the occurrence of an error. A file is created containing the contents of memory, request, data structures, etc., that are currently being used by the application. This provides the user a "snapshot" of what is going on in the application and a given point in time. Depending upon the resources and implementation, the snapshot may focus on small sections of the application (e.g., a particular data structure), the entire application state (e.g., a UNIX core file) and many areas therebetween.

Specific error handling/recovery code is very common in applications. Such code is configured to handle possible errors that might occur under certain conditions, give the user feedback about the error condition, and provide the user with alternatives. Expected errors might be "file not found", in which case the user can retry with a new location or filename.

However, existing debugging techniques suffer from various disadvantages. For example, tracing strategies tend to be very inefficient from a performance perspective. Further, tracing does not allow users to automatically avoid the error condition(s) nor does it facilitate re-creating problem scenarios that might be caused by outside influences. Dumping is a substantially limited solution in that it is after the fact and does not at all facilitate determining the symptoms leading up to the problem. As such, dumping does not allow a user to determine how the problem may be avoided in the future (should the same conditions be present again). In the case of specific error handling/recovery code, generic code may be written that simply handles any unexpected errors, presenting appropriate error information (collecting trace or dumb files) and directing the user to try again (or perhaps not, because the error was unexpected). Accordingly, such error handling/recovery code is very limited in its ability to allow users to identify and react to the particular conditions giving rise to a particular problem.

Therefore, there is a need for a method, apparatus and article of manufacture for service and/or recovery from application errors.

SUMMARY OF THE INVENTION

The present invention generally provides methods, systems and articles of manufacture for performing multiple request processing. Multiple instances of executing entities service requests in a relative time-delayed fashion. In this way, a user can be returned to an earlier state in the execution flow.

One embodiment provides a computer-implemented method for parallel processing of requests. The method comprising initiating a primary executing entity configured to perform requests and maintain state information specific to the primary executing entity; initiating a secondary executing entity configured to perform requests and maintain state information specific to the secondary executing entity; performing, by the primary executing entity, requests; and performing, by the secondary executing entity, the requests previously performed by the primary executing entity in a time-delayed and step-wise fashion (i.e., in the same sequence) while the primary executing entity continues to execute requests, whereby each executing entity maintains its own respective state information independent of, and temporally displaced from, the other executing entity.

Another computer-implemented method for parallel processing of requests comprises receiving user requests from a user; placing the user requests on a queue in a time-ordered manner; performing, by a primary executing entity, each current user request upon being placed on the queue; and performing, by a secondary executing entity, at least a portion of the user requests on the queue step-wise with the primary executing entity and N-requests behind the primary executing entity; wherein each of the executing entities maintain their own respective state information.

Yet another embodiment of a computer-implemented method for parallel processing of requests comprises receiving user requests from a user; placing the user requests on a queue in a time-ordered manner; performing, by a primary executing entity, each current user request upon being placed on the queue, wherein the performance of requests on the queue by the primary executing entity are visible to the user; and performing, by a plurality of secondary executing entities, at least a portion of the user requests on the queue step-wise with the primary executing entity and in a manner transparent to the user; wherein each of the secondary executing entities is displaced from the primary executing entity and from one another by a number of user requests; and wherein each of the executing entities maintain their own respective state information.

Still another embodiment provides a computer readable medium containing a program which, when executed, implements an operation for parallel processing of requests. In one embodiment the operation comprises initiating a primary executing entity configured to perform requests and maintain state information specific to the primary executing entity and initiating a secondary executing entity configured to: (i) perform requests previously performed by the primary executing entity in a time-delayed and step-wise fashion while the primary executing entity continues to execute requests; and (ii) maintain state information specific to the secondary executing entity, whereby each executing entity maintains its own respective state information independent of, and temporally displaced from, the other executing entity.

In another embodiment the operation for parallel processing of requests comprises receiving user requests from a user; placing the user requests on a queue in a time-ordered manner; performing, by a primary executing entity, each current user request upon being placed on the queue; and performing, by a secondary executing entity, at least a portion of the user requests on the queue step-wise with the primary executing entity and N-requests behind the primary executing entity; wherein each of the executing entities maintain their own respective state information.

In another embodiment the operation for parallel processing of requests comprises receiving user requests from a user; placing the user requests on a queue in a time-ordered manner; performing, by a primary executing entity, each current user request upon being placed on the queue, wherein the performance of requests on the queue by the primary executing entity are visible to the user; and performing, by a plurality of secondary executing entities, at least a portion of the user requests on the queue step-wise with the primary executing entity and in a manner transparent to the user; wherein each of the secondary executing entities is displaced from the primary executing entity and from one another by a number of user requests; and wherein each of the executing entities maintain their own respective state information.

Still another embodiment provides a system configured for parallel processing of requests. The system comprises a request queue on which requests are placed in a time-ordered manner; primary and second executing entities and a request manager. The primary executing entity is configured to process requests from the request queue. The secondary executing entity is configured to process requests from the request queue in step-wise and a time-delayed with respect to the primary executing entity, whereby the at least one secondary executing entity performs request processing N requests behind the primary executing entity; and wherein each of the executing entities maintain their own respective state information. The request manager is configured to make the primary executing entity visible to a user placing the requests on the request queue and make the secondary executing entity transparent to the user, until encountering an error. Upon encountering the error, the request manager terminates the primary executing entity and makes the secondary executing entity visible to the user, whereby the user is given the appearance of being returned to a prior request in the execution path the primary executing entity.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides methods, systems and articles of manufacture for performing multiple request processing. Multiple instances of executing entities service requests in a relative time-delayed fashion. In this way, a user can be returned to an earlier state in the execution flow.

One embodiment of the invention is implemented as a program product for use with a computer system. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
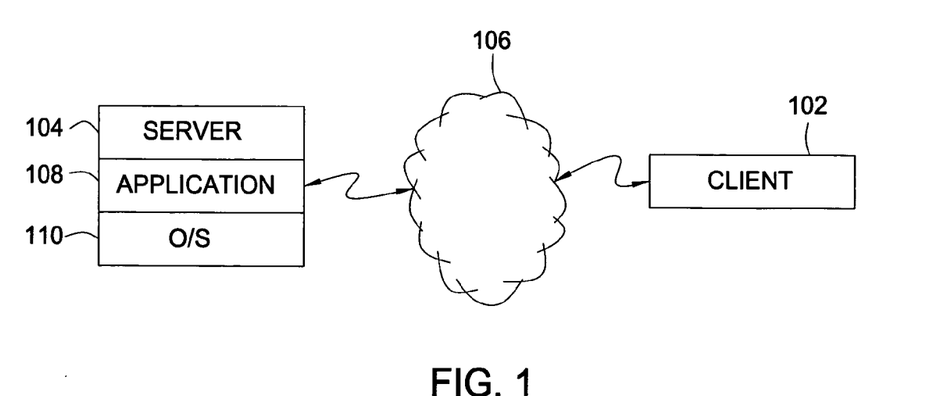
FIG. 1 is a block diagram of a computing environment having a client and server.

Referring now to FIG. 1 a block diagram is shown of a distributed environment 100. Illustratively, the environment 100 is a client-server environment in which a client 102 and a server 104 communicate via a network 106. The server 104 is generally under the control of an operating system 110. Examples of the operating system 110 include IBM OS400®, UNIX, Microsoft Windows®, and the like. More generally, any operating system capable of supporting the functions described herein may be used.

The server 104 is shown as an application server for an application 108. The server 104 and the application 108 may reside on the same machine, or may themselves be distributed over the network 106. In general, the network 106 may be a local area network (LAN) and/or a wide area network (WAN). In a particular embodiment, the network 106 is the Internet, the server 104 includes a web server (e.g., an HTTP server) and the application is a Web application. In the case, the client 102 may include a web-based Graphical User Interface (GUI), which allows a user to display Hyper Text Markup Language (HTML) information. However, it is noted that aspects of the invention need not be implemented in a distributed environment, nor need the invention be Web-based. As such, a user may interact with the application on a local machine, such as is typically the case of a user using a word processor, for example.

Figure 2:
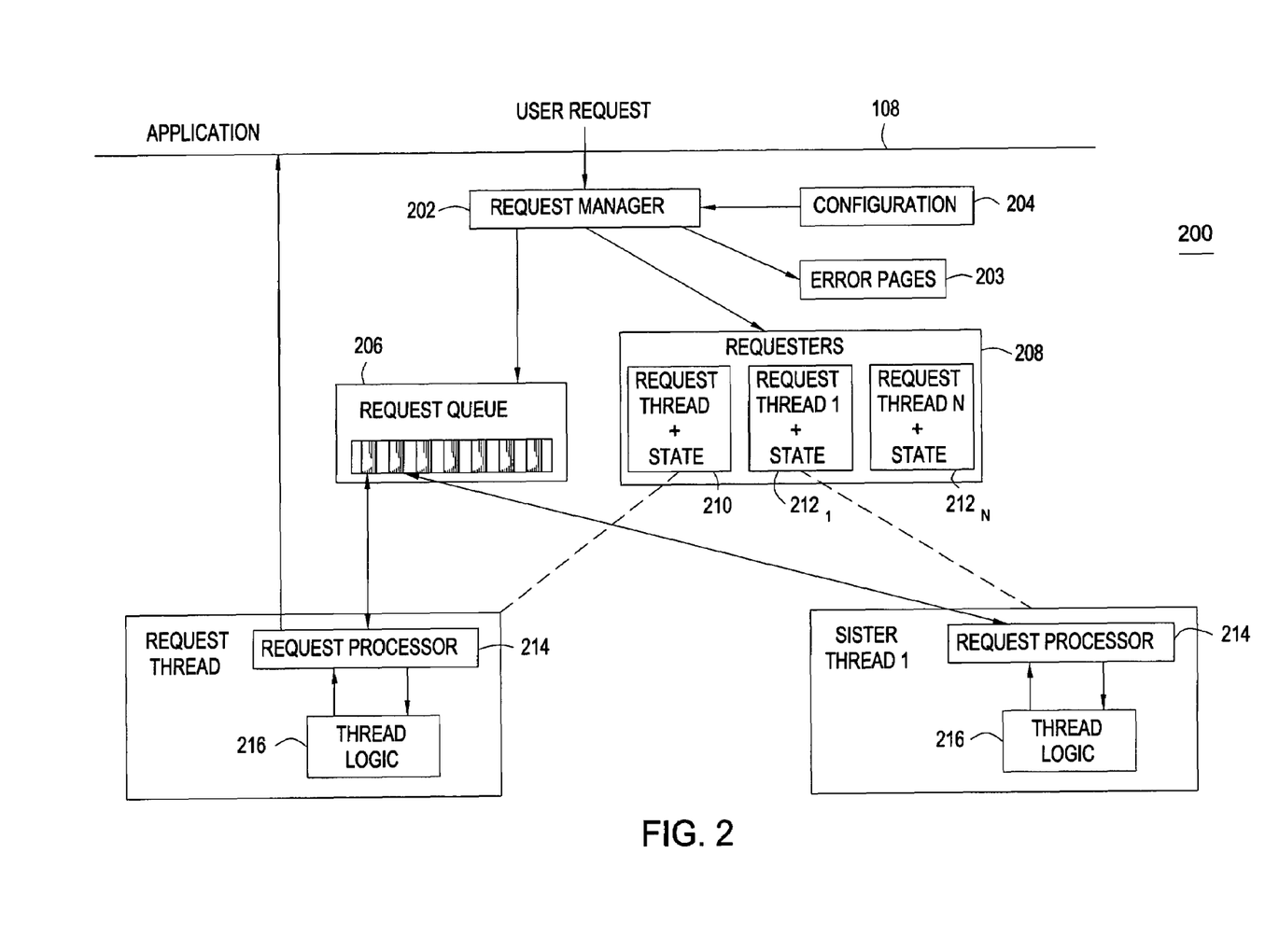
FIG. 2 is a block diagram of an application configured to implement requesters adapted service users' requests.

Referring now to FIG. 2 one embodiment of the application 108 is shown. In general, the application 108 includes a request manager 202, a configuration file 204, a request queue 206, and a plurality of request entities 208. The configuration file 204 specifies the attributes of the request manager 202 and may, for example, be read when the application 108 is launched. It is contemplated that the configuration file 204 can be manipulated by a user, such that the request manager 202 is user-configurable. The request manager 202 performs a variety of functions including receiving user requests, implementing the request queue 206 on which the user requests may be queued and displaying interfaces, such as error pages 203. To perform the queued requests the request manager also creates the plurality of requesters 208. Illustratively, the requesters 208 are implemented as a plurality of threads including a request thread 210 and one or more sister threads 212. As used herein, "threads" generally refer to executing entities capable of performing requests on the request queue 206 in parallel with one another. As such, the requesters 208 may, in a particular embodiment, be representative of objects in an object-oriented programming environment. An operating system thread then processes each of the objects, thereby giving the appearance of parallel executing instances/entities. Persons skilled in the art will recognize other embodiments, all of which are within the scope of the present invention. Regardless of the particular implementation, the requesters 208 may generally be referred to herein as executing entities or instances. In this regard, it is understood that the reference to "executing" is not intended to imply that the requesters 208 are always executing, since it may be necessary to halt their execution from time to time. However, even while halted, the requesters preserve their respective state information.

In the illustrative embodiment, each requester thread 208 includes a request processor 214 and thread logic 216. The request processor 214 is configured to retrieve requests from the request queue 206. A retrieved request is then handled (i.e., processed) by the thread logic 216. Thus, the thread logic 216 may include a routing function to route the request, an action function to perform the request, and an interface function to invoke any appropriate interfaces for display to the user.

Figure 3:
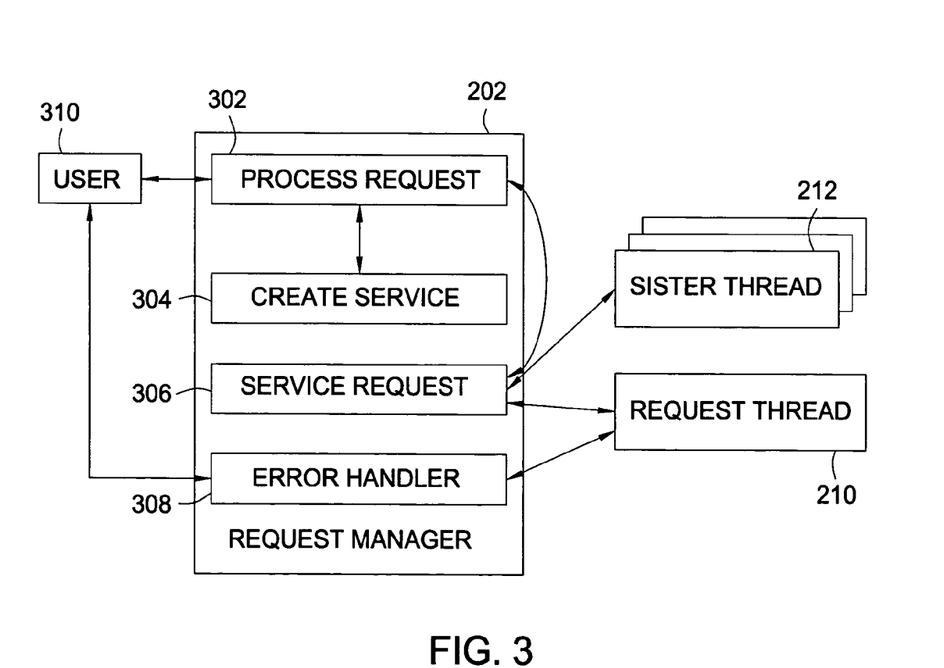
FIG. 3 is a block diagram illustrating interaction between a request manager and the requesters shown in FIG. 2, and a user.

Referring now to FIG. 3, one embodiment of the request manager 202 is shown. In general, the request manager 202 includes a plurality of functions interacting with each other, a user 310, the request thread 210 or the sister threads 212. In operation, a process request function 302 receives requests from the user 310 (which may be a human operator, the operating system, another application, or any other requesting entity). The process request function 302 then invokes the create services function 304 to create a request queue 206. Thus, in one embodiment, a separate request queue 206 is created for each user. However, in an alternative embodiment, two or more users share a single request queue 206. In any case, a process request function 302 then calls for service request function 306. The service request function 306 is generally configured to interact with the request thread 210 and the sister threads 212 to process the requests. In the event of an error while processing a request, the request thread 210 calls an event handler 308.

Figure 4:
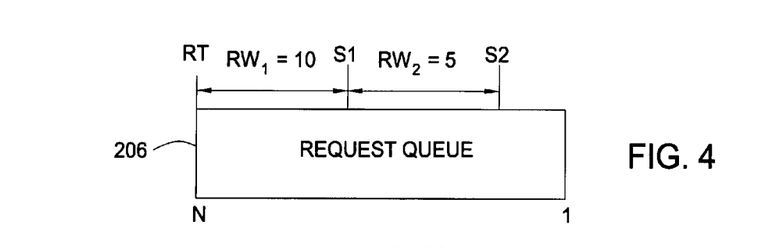
FIGS. 4-6 shows a representative request queue and illustrates processing of requests by a primary requester (request thread) and two secondary requesters (sister thread).
Figure 5:
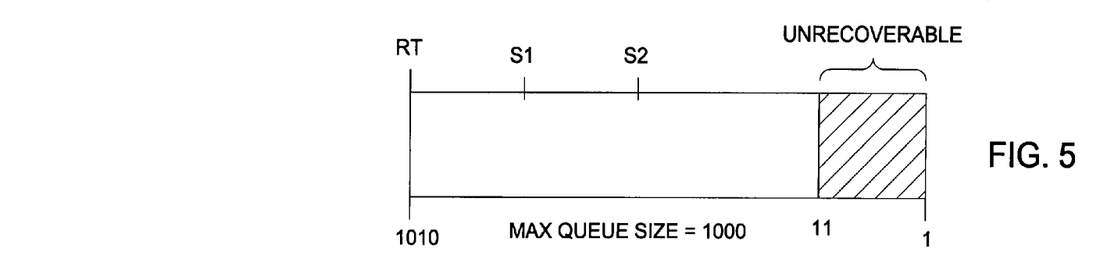

In one aspect, recovery from errors is possible due to the provision of sister threads 212. This aspect may be illustrated with reference to FIGS. 4-6. FIG. 4 shows a request queue 206 having a number of requests, N, enqueued. By definition, the request thread 210 (shown as RT) is configured to handle the current request on the queue 206. That is, the request thread 210 is responding to (i.e., processing) the user's current activity and ensuring the any appropriate results are returned to the user for display. Any sister threads are temporarily displaced with respect to the request thread and, as a result, are imperceptible to the user during normal (i.e., error-free) operation. The temporal displacement of sister threads with respect to the request thread, or the immediately preceding sister thread, is defined by a number of requests and is referred to herein as a "redundancy window". For example, a first sister thread, S1, is displaced from the request thread by 10 requests, i.e., a redundancy window (RW1) of 10. A second sister thread, S2, is displaced from the first sister thread by 5 requests, i.e., a redundancy window (RW2) of 5. (Of course, it is contemplated that any subsequent redundancy windows may be defined with respect to the request thread, in which case RW2=15.) It is contemplated that both the number of sister threads and their respective redundancy windows is a configurable option defined in the configuration file 204 (FIG. 2).

It is noted that both the request thread 210 and the sister threads 212 preserve their own thread-specific state information. More particularly, each request thread is initiated from the beginning of the request queue 206, executes each request in the same order and maintains state information specific to that instance of execution. Thus, assuming all else is constant, each of the requester threads will be replicas of one another at a given request on the queue 206.

It follows, then, that a sister thread may not be instantiated once even one request is removed from the request queue 206. Given the overhead associated with maintaining a large queue, the request queue 206 will typically (but not necessarily) have a limited size and begin discarding requests according to a FIFO (first-in-first-out) model when the maximum size parameter is exceeded. This aspect is illustrated with respect to FIG. 4 and FIG. 5 which shows a request queue 206 having a defined maximum size of 1000. In the present illustration the request thread (RT) is handling request 1010 (counted from the first request to be placed on the queue). Since the queue size is 1000, the first 10 requests have been discarded (represented by the shaded area of the request queue 206 shown in FIG. 5) and the earliest request remaining is request 11. Accordingly, while sister threads S1 and S2 continue to execute unaffected, no new sister threads may be created.

Figure 6:
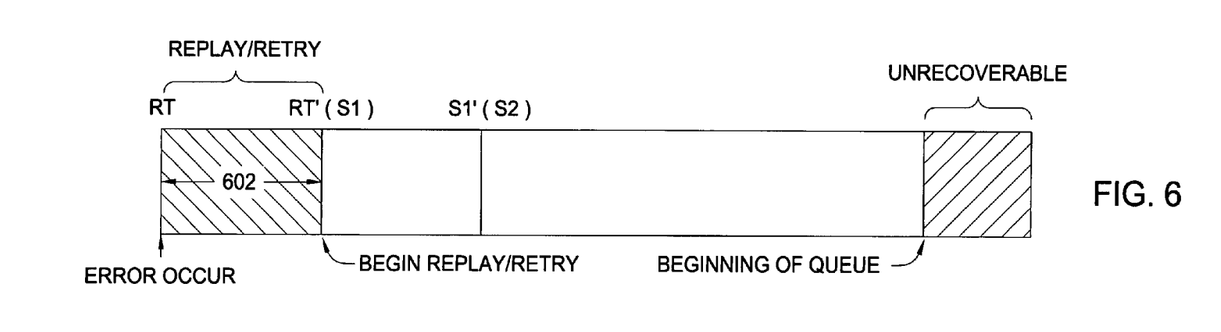

Referring now to FIG. 6, assume now the current request thread (RT) encounters an error. In one aspect of the invention, the sister threads (S1 and S2) provide temporally displaced executing instances which the user may use to advantage to "return" to earlier point in time. It is noted that the sister threads (S1 and S2) do not represent the execution history of the request thread (RT). Rather, each sister thread is an independent execution path. However, because each thread is executing the same requests in the same order, albeit temporally displaced from one another, each presumably provides a replica of the others at a given request on the queue. As such, when the request thread (RT) encounters the error, the user may choose to switch to the execution path of either sister thread, S1 and S2. In the present example, the user elects to switch to the execution path of the first sister thread S1. Accordingly, former first sister thread S1 now becomes the request thread (indicated as RT') and the former second sister thread S2 becomes the first sister (indicated as S1') thread relative to the new request thread RT'.

The foregoing assumes that a portion of the requests have been discarded from the request queue, thereby making it impossible to initiate new sister threads, regardless of how many sister threads are specified in the configuration file 204 of FIG. 2. As a result, the user must elect to switch to one of the two existing sister threads and the earliest sister thread (S2 in the present example) is the farthest a user may go back in his/her request history. However, in the event all requests are preserved on the queue (since the beginning of the session), a user may choose to begin executing from the beginning of the queue, regardless of whether any sister threads had been initiated.

In one embodiment, a user is given the option of either replaying or retrying execution from a selected sister thread. These functions are referred to herein as "replay processing" and "retry processing", respectively. "Replay processing" allows the user to step through the same execution path starting from the current position of the selected sister thread, which now becomes the request thread (RT' in the example illustrated in FIG. 6). Thus, in the case of a "replay" the requests between when the error occurred and the selected sister thread are preserved and re-executed. In contrast, "retry processing" discards the requests between when the error occurred and the selected sister thread and allows the user to make different requests. In either case, the relevant portion of requests from the request queue 206 is represented by the shaded area 602 FIG. 6.

It is further contemplated that a user may be given the option of a hybrid form of replay and retry processing. Specifically, by default, replay processing re-executes each of the requests from a selected sister thread to the occurrence of an error. As an alternative, the user may specify some other request to which replay processing is performed (i.e., some request prior to the occurrence of the error). Upon reaching the specified request, retry processing is initiated, whereby the user is allowed to make new requests.

One aspect of replay processing is referred to herein as "consume processing". Consume processing refers to the processing performed by the other sister threads (i.e., those sister threads executing subsequent to the user-selected sister thread) in order to maintain the defined redundancy window (s).

Particular embodiments of the invention will now be described with reference to flowcharts illustrated in FIG. 7-12. It will be appreciated that, given the particular environment having multiple parallel executing instances, some degree of interconnectivity between the flowcharts is inevitable. As a result, it may be necessary to refer to subsequently described steps, from time to time.

Figure 7:
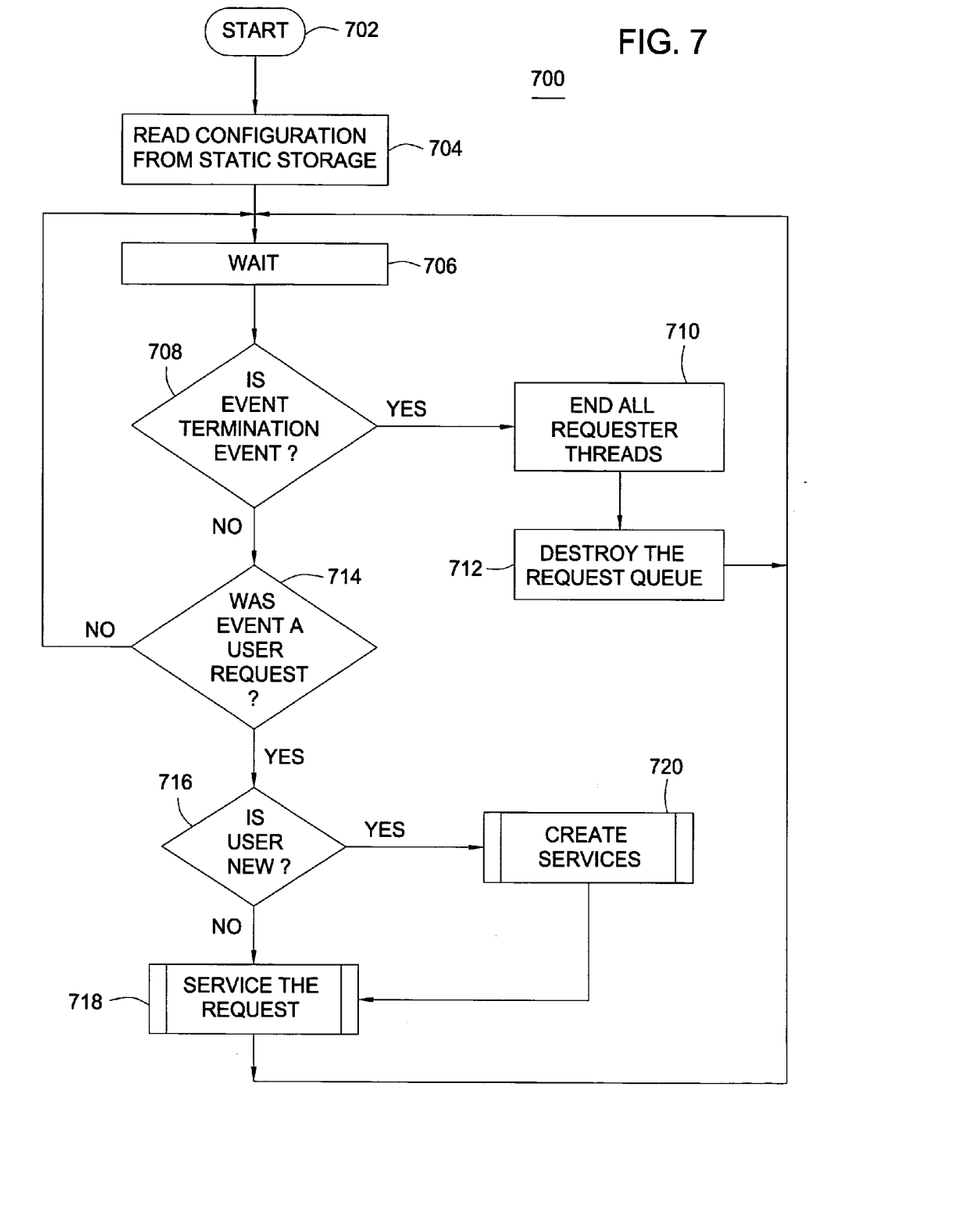
FIG. 7 is a flowchart illustrating one embodiment of request processing performed by a "request processing" function of the request manager.

Referring first to FIG. 7, an exemplary method 700 for processing a user's request is illustrated. In one embodiment, the method 700 is implemented by the process request function 302. Upon entering the method 700 (step 702), the request manager reads its configuration from the configuration file 204 (step 704) which may reside in some static storage, such as, a computer disk or database. Initially, the request manager goes to a wait state (step 706), waiting for an event of interest to occur. Instead of the request manager, a web server may handle implementation of this wait state. When an event of interest occurs during the wait state, the request manger examines the event to determine whether it is a termination event (e.g., a user session expiration, logging out, the user application ending, etc.) (step 708). If the event is a termination event, the request manager ends all requester threads 208 (step 710) and destroys the associated request queue 206 (step 712). When the request queue is destroyed, all of the user's associated information is cleared from the system. The system then, returns back to the wait state to wait for the next event of interest to occur. If the event encountered is not a termination event, then the request manager examines the event to determine whether it is a user request (step 714). When the event is a user request, the request manager next determines whether the user is new or not (step 716). A user may be determined as new when no user specific information (i.e., user ID and associate state information) exists in the system for that user. If the user is new, then the request manager invokes the create services function 304 (step 720) for the new user, as described in more detail below with respect to FIG. 8. The request manager then goes back to waiting for the next event. When the user is not new or after invoking the create services function 304 for new users, the request manager then services the request by invoking the service request function 306 (step 718), as described in more detail below with respect to FIG. 9. Next, the request manager returns to the wait state until occurrence of the next event of interest.

Figure 8:
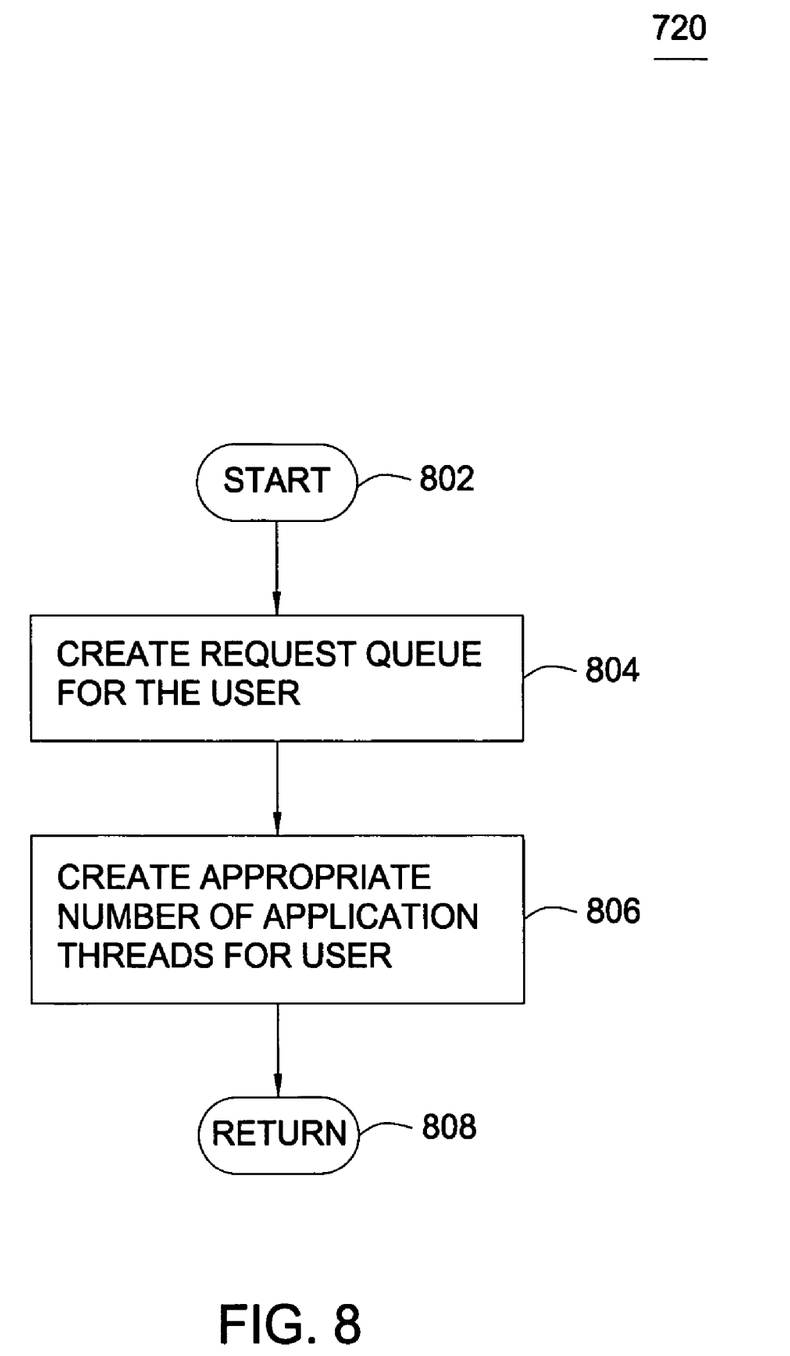
FIG. 8 is a flowchart illustrating one embodiment of request processing performed by a "create services" function of the request manager.

As described previously, creating services may be invoked by the create services function 304. FIG. 8 illustrates one embodiment of exemplary operations at step 720 for creating new services for a new user. Upon entering the method 720 (step 802), the request manager creates a new request queue for the new user (step 804). Then, the request manager creates an appropriate number of application threads for the user (step 806), as defined by the configuration file 204. Application threads may consist of a request thread 210 and the corresponding application state, and zero or more sister threads 212 (depending on the configuration) along with the corresponding application state. Next, the method 720 returns back to the process request function 302 (step 808).

Figure 9:
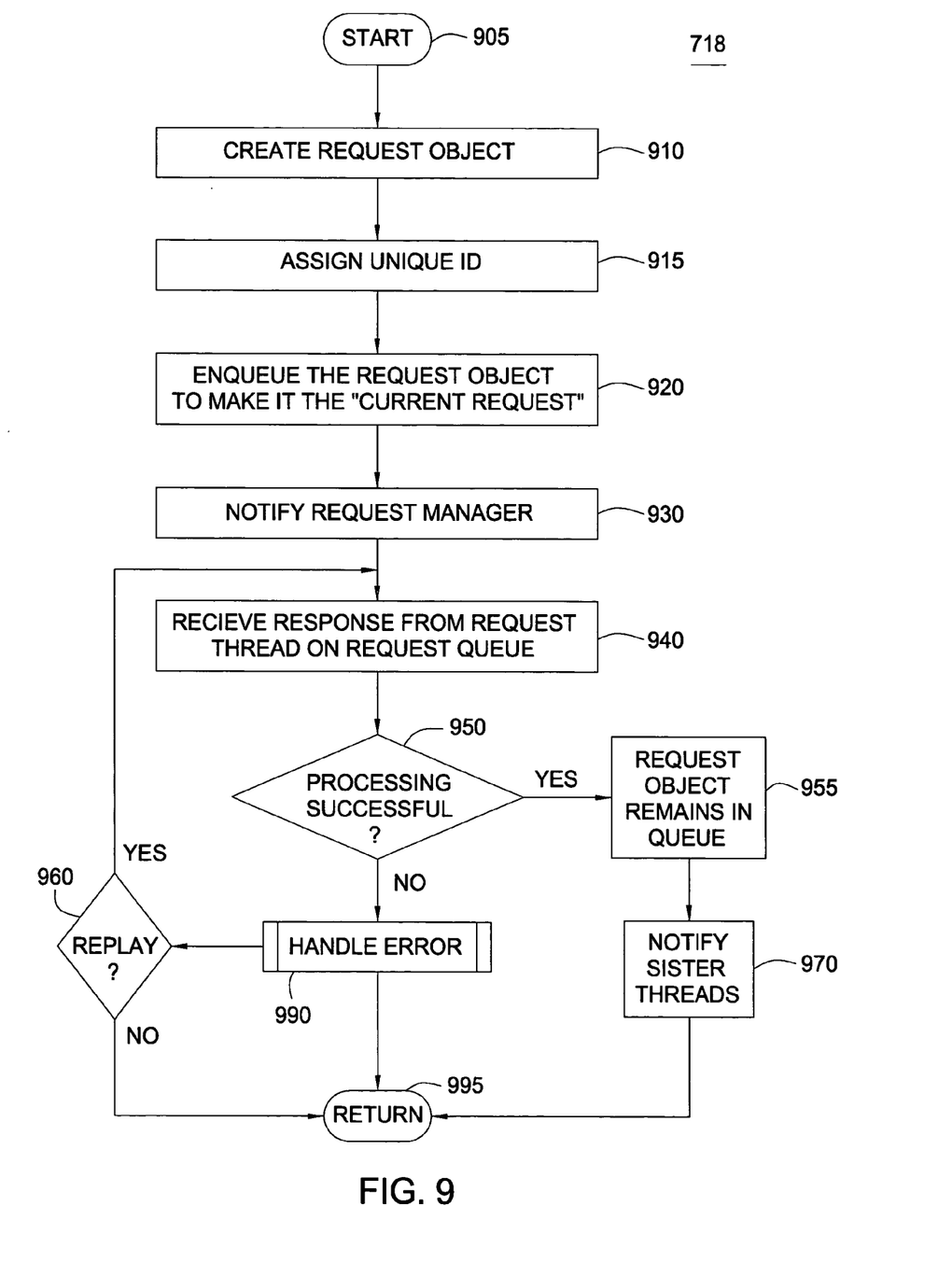
FIG. 9 is a flowchart illustrating one embodiment of request processing performed by a "service request" function of the request manager.

As previously described, each new request may be serviced before being processed. FIG. 9 illustrates one embodiment of exemplary operations at step 718 for servicing a new request. In one embodiment, the method 718 is implemented by the service request function 306. Upon entering the method 718 (step 905), the request manager creates a new request object for the request (step 910). The request object may contain all the relevant information and parameters required to process the user request. By way of analogy, a request object, may resemble an HTTP request object. Next, the newly created request object is assigned a unique identifier (step 915).

In one embodiment, the unique identifier name may include information meaningful to the user based on the application flow or parameters. Alternatively, the request may be assigned a number. After being assigned a unique identifier, the request object is enqueued to the request queue 206 (step 920). The request, therefore, becomes the current request in the queue. Then, the request manager notifies the request thread 210 that a request is available (step 930) and waits for a response from the request thread 210 (step 940). After receiving a response form the request thread 210, the request manager determines whether the request was processed successfully (step 950). If the request thread 210 has encountered a failure in processing the request, the request manager invokes the error handler function 308 (step 990), as described in more detail below with respect to FIGS. 12A-12B. After results are returned from the error handler function 308, the request manager determines whether the error was handled by performing a replay or retry (step 960). When a replay has been performed, the request manager determines whether processing was successful (step 950). If so, the sister thread(s) 212 are notified (step 970). This notification signals the sister thread(s) 212 to get the next request from the request queue, as will be described in more detail below with respect to FIG. 11. If the error was handled in any other way (e.g., by performing a retry, choosing to ignore and continue, or selecting optional debug actions) or after notifying the sister thread (s) 212, the method 718 returns back to the process request function 302 (step 995).

Figure 10:
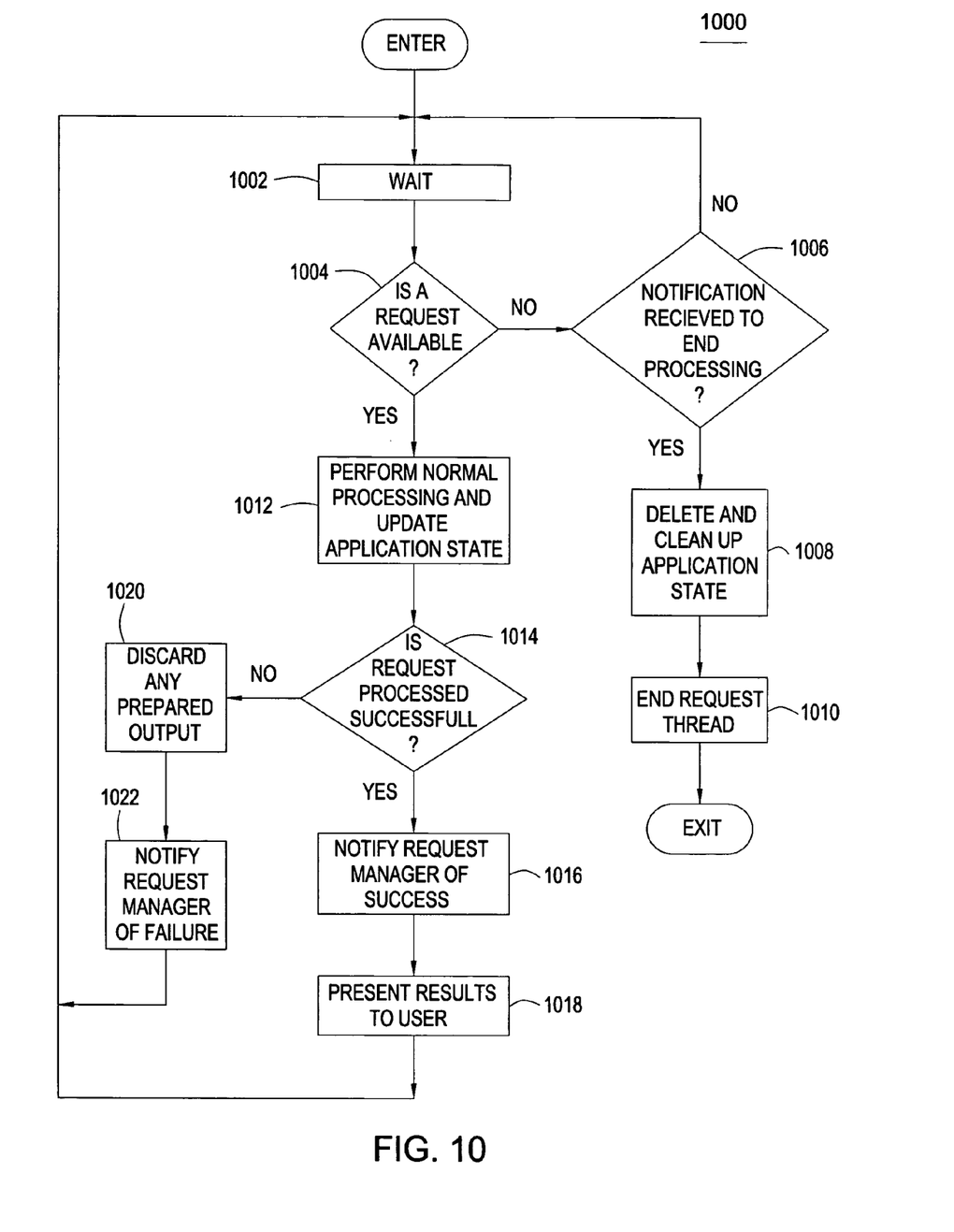
FIG. 10 is a flowchart illustrating one embodiment of request processing performed by a "request thread wait loop" function of the request manager.

Referring now to FIG. 10, one embodiment of a request thread wait loop 1000 is illustrated. The wait loop 1000 is implemented by the request thread 210 and begins at step 1002, where the request thread enters a wait state. Upon receipt of an event, the request thread determines whether a request is available for processing (step 1004). That is, the request thread determines whether a new request has been placed on the request queue 206 for processing. If not, the request thread determines whether the event is a notification to end processing (step 1006). If not, the request thread continues waiting. If the event is a notification to end, the request thread deletes and cleans up (e.g., freeing allocated storage, releasing resources, closing files and network connections, etc.) the application state which it had been maintaining (step 1008) and then terminates (step 1010).

Returning to step 1004, if a request to be processed is available on the queue, the request thread performs the necessary processing, according to the request, and updates its application state (step 1012). The request thread then determines whether the request was processed successfully (step 1014). If so, the request manager 202 is notified (step 1016). In particular, the service request function 306 of the request manager 202 is notified (at step 940 of FIG. 9). The user is then presented with any results (step 1018), as is appropriate depending on the request.

Returning to step 1014, if the request was not successfully processed (e.g., an error was encountered), the request thread discards any output prepared while processing the failed request (step 1020). The request manager 202 is notified of the failure (step 1022). In particular, the service request function 306 of the request manager 202 is notified at step 940 of FIG. 9. As will be described below with reference to FIGS. 12A-12B, the error handler 308 of the request manager 202 is responsible for presenting the user with the appropriate error page 203 (see FIG. 2). The request thread then returns to a wait state (step 1002).

Figure 11:
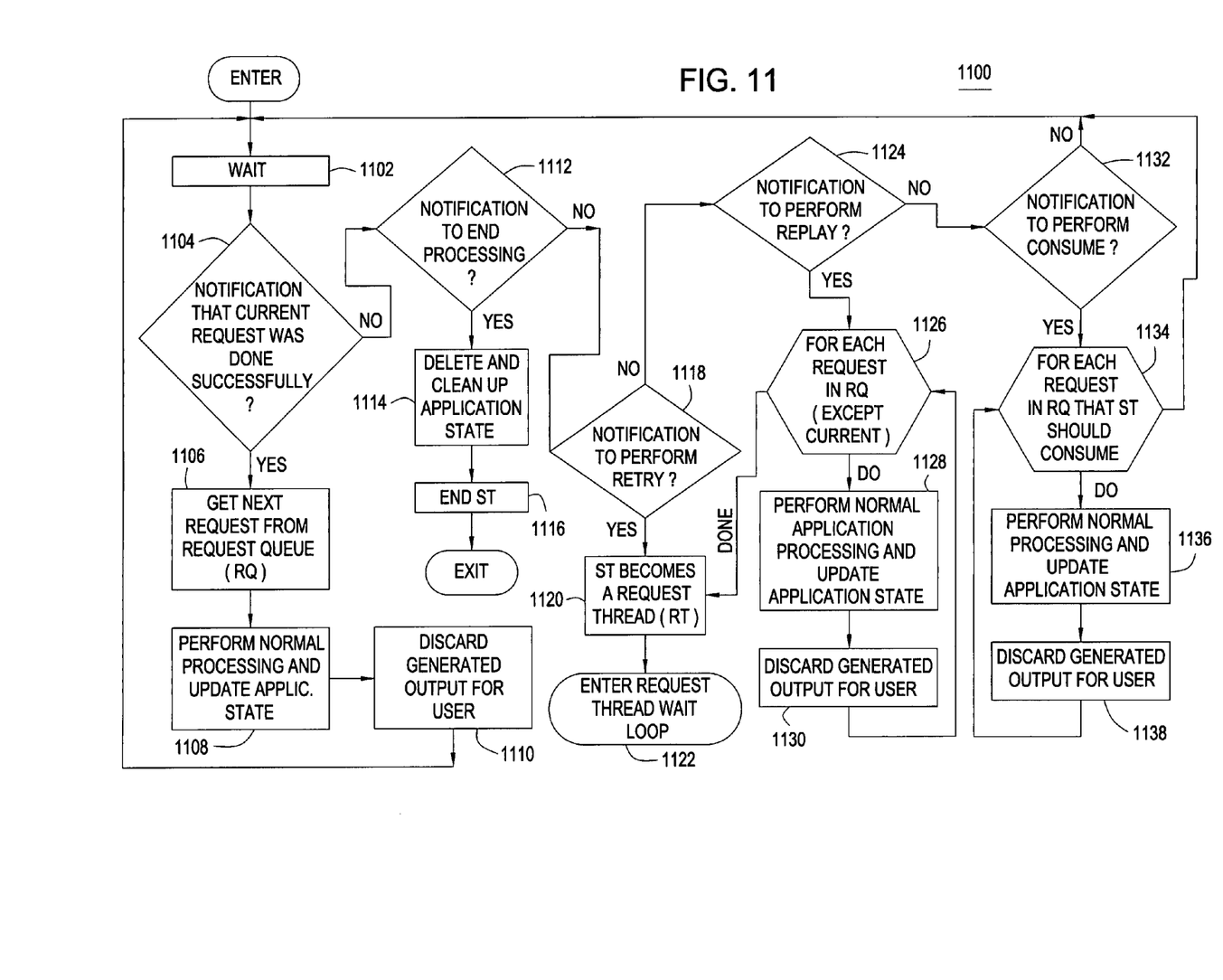
FIG. 11 is a flowchart illustrating one embodiment of request processing performed by a "sister thread wait loop" function of the request manager.

Referring now to FIG. 11, one embodiment of a sister thread wait loop 1100 is illustrated. The wait loop 1100 is implemented by each of the sister threads 212 and begins at step 1102, where the sister thread enters a wait state until receipt of an event. In the illustrative embodiment, the event is one of (i) a notification of successful performance of the current request (determined at step 1104), (ii) a notification to end processing (determined at step 1112), (iii) a notification to perform "retry processing" (determined at step 1118), (iv) a notification to perform "replay processing" (determined at step 1124) or a notification to perform "consume processing" (determined at step 1132).

Recall that a notification of successful performance of the current request is issued by the service request function at step 970 described above with respect to FIG. 9. Receipt of such a notification indicates to the sister thread that it may get the next request from the request queue (step 1106). The sister thread then performs the request and updates its application state based on the type of request and actions undertaken as part of the request (step 1108). Any output generated for the user during performance of the request is discarded (step 1110), since any output to the user for this request will be presented at a different time by the request thread or the request manager. The sister thread then returns to a wait state (step 1102).

A notification to perform retry processing (determined at step 1118) is received from the error handler 308, as will be described in more detail below with respect to FIGS. 12A-12B. Upon receiving this notification the sister thread is logically named as the request thread (step 1120) and control flows to the request thread wait loop (step 1122), described above with respect to FIG. 10. Accordingly, the former sister thread performs retry processing as the request thread using new requests being input from the user.

A notification to perform replay processing (determined at step 1124) is received from the error handler 308, as will be described in more detail below with respect to FIGS. 12A-12B. Upon receiving this notification, the sister thread enters a loop (at step 1126) that is performed for each request in the request queue, except for the current request. In particular, the sister thread performs normal application processing and updates the application state accordingly (step 1128). Further, the sister thread discards any output generated for presentation to the user (step 1130). Once the sister thread has consumed all requests up to the current request, the sister thread is logically named the request thread (step 1120) and control flows to the request thread wait loop (step 1122), described above with respect FIG. 10. In this way, all the requests (except the current request) are performed in a manner that is transparent to the user and the user is only presented with output that is appropriate to processing of the current request.

A notification to perform "consume processing" (determined at step 1132) is received from the error handler 308, as will be described in more detail below with respect to FIGS. 12A-12B. Upon receiving this notification, the sister thread enters a loop for each request in the request queue that the sister thread has been instructed to consume (step 1134). In particular, the sister thread performs normal application processing and updates the application state accordingly (step 1136). Further, the sister thread discards any output generated for presentation to the user (step 1138). Once the sister thread has consumed all appropriate requests, the sister thread returns to a wait state (step 1102).

Finally, if the event is a notification to end processing (step 1112), the sister thread deletes and cleans up its application state (step 1114) and then terminates (step 1116).

Figure 12A:
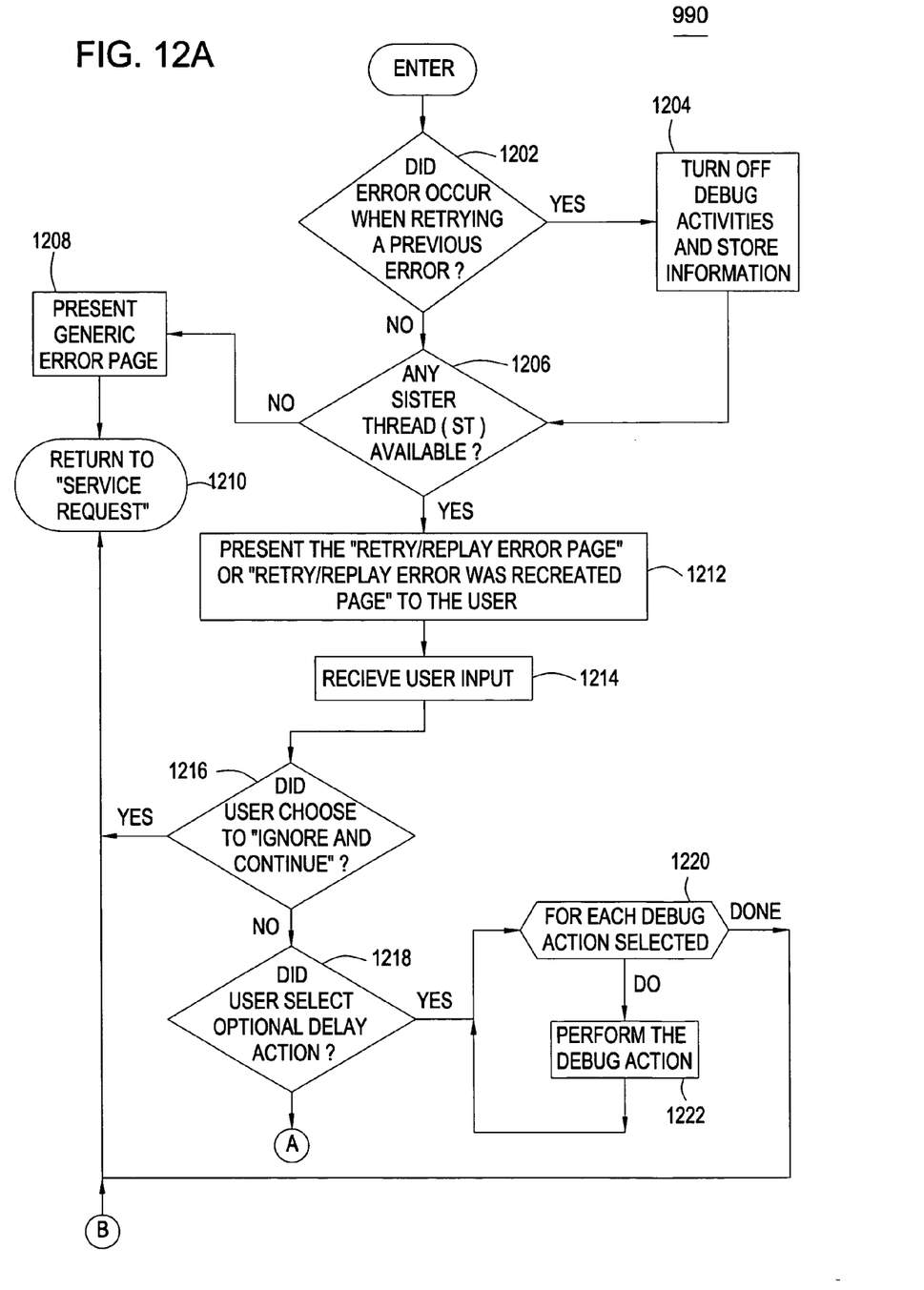
FIG. 12A and FIG. 12B are a flowchart illustrating one embodiment of request processing performed by an "error handling" function of the request manager.
Figure 12B:
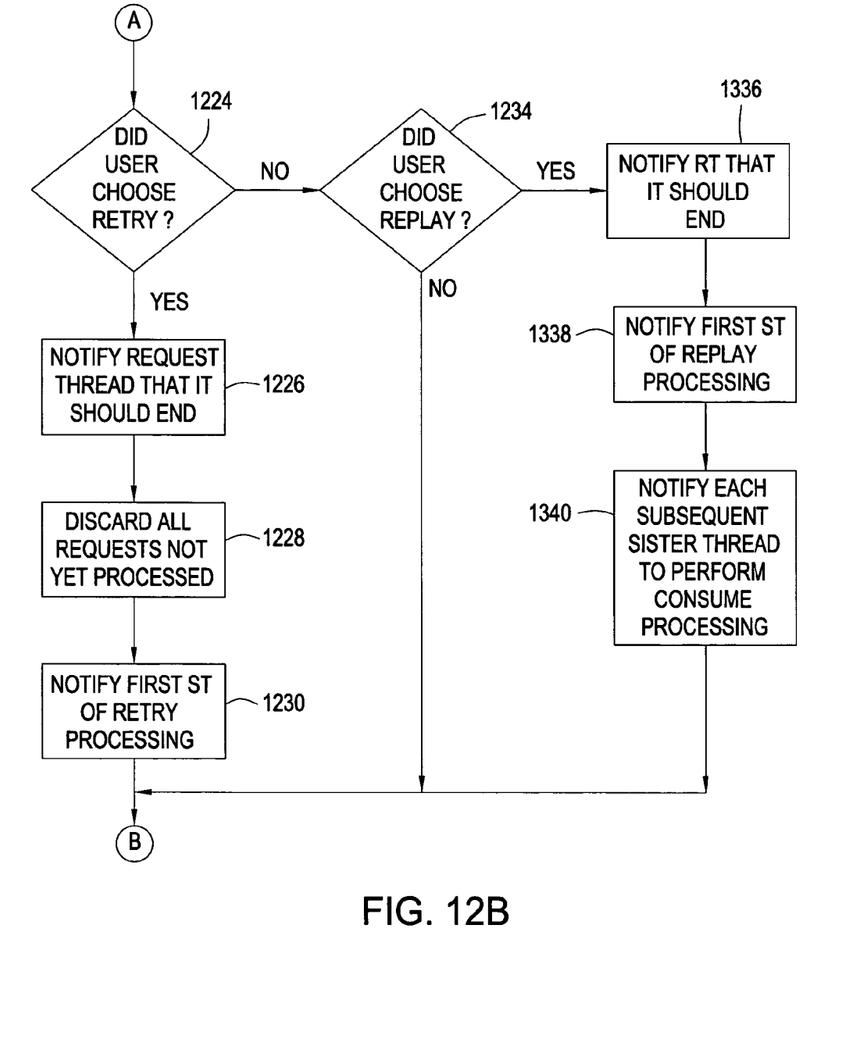

Referring now to FIG. 12A and 12B, one embodiment of the operations performed at step 990 of FIG. 9 is shown. As noted previously, these operations may be performed by the error handler 308 of the request manager 202. Upon being invoked in response to unsuccessful processing of request, the error handler determines whether the error occurred while retrying a previous error (step 1202), i.e., when performing retry processing. If so, all debug functions are turned off and any tracing/debug information is stored in persistent storage for later use (step 1204).

Figure 13:
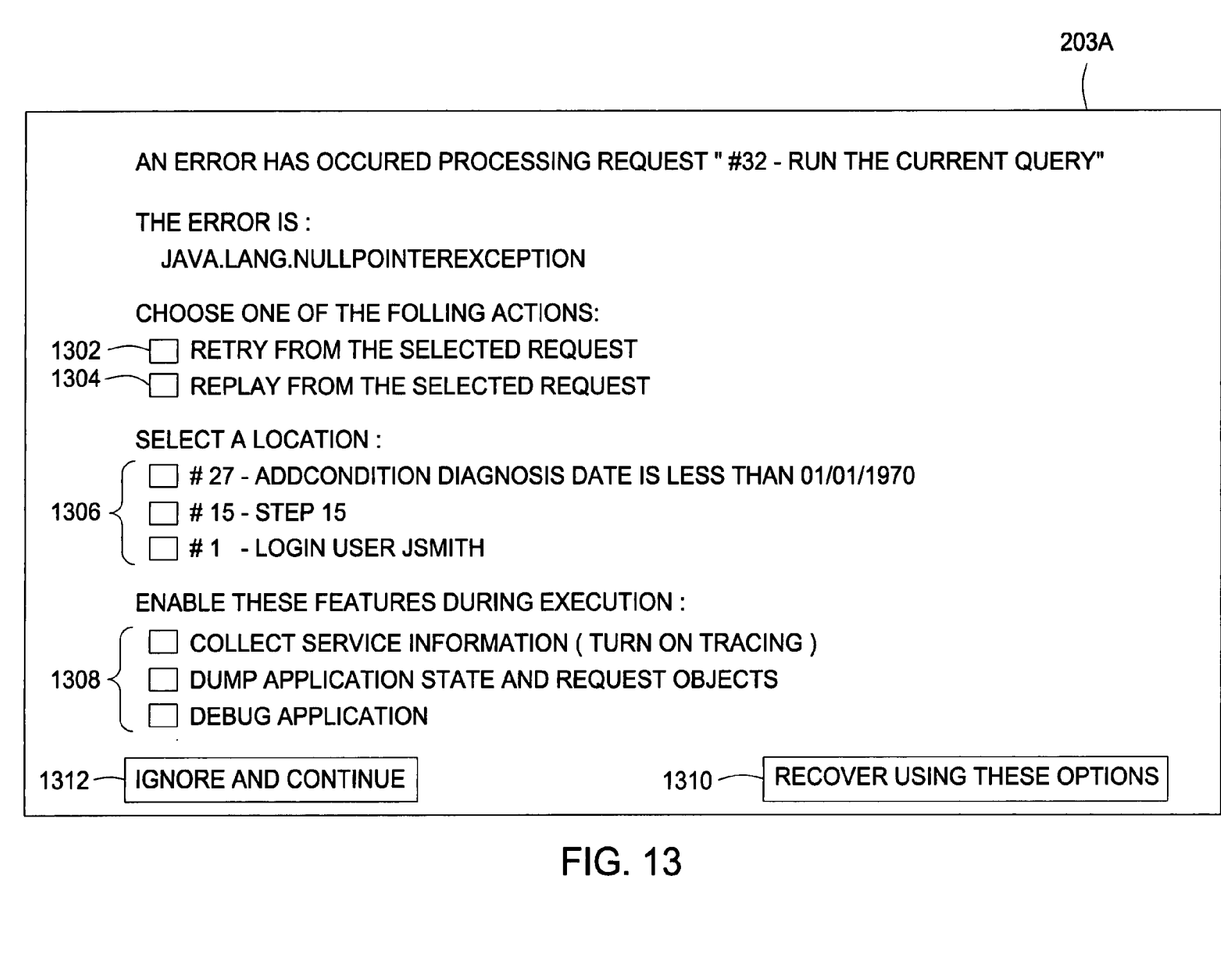
FIG. 13 illustrates an example of an error page displayed to the user in response to encountering an error while processing a request the result of a retry, according to the embodiment of the invention.

If step 1202 is answered negatively, or after performing step 1204, the event handler determines whether any sister threads are available (step 1206). If not, the user may be presented with a generic error message (step 1208), i.e., one of the error pages 203 indicating the occurrence of an error, after which control may return to the service request function 306 (step 1210). If at least one sister thread does exist, the error handler may present one of the error pages 203 allowing the user to select from one or more options (step 1212). In particular, the error page may allow a user to select retry processing or replay processing. It is contemplated, however, that the particular options made available to the user will depend upon previous selections made by the user in response to errors. These aspects may be illustrated with respect to FIGS. 13-14. Illustratively, FIG. 13 shows an error page 203A displayed to the user in response to encountering an error while processing request No. 32 (named "Run the current query"). The user is given the option of performing retry processing, by selecting a first checkbox 1302, or replay processing by selecting a second checkbox 1304. Upon making a selection of either retry or replay processing, the user then selects the location from which retry/replay processing is performed. Each selectable location (represented by the checkboxes 1306) corresponds to a sister thread at that location. It is contemplated that, in the case of retry processing, the user may specify any request between the selected sister thread and the request thread which encountered the error. In this case, the selected sister thread performs consume processing up to the selected request (or the immediately proceeding request, depending on the particular implementation). In addition, the user is presented with debugging functions (checkboxes 1308) from which to select. Having made the desired selections, the user then clicks on the "Recover using these options" button 1310 to perform the selected retry/replay processing. Alternatively, the user may choose to ignore the error and continue processing by clicking the button 1312.

Figure 14:
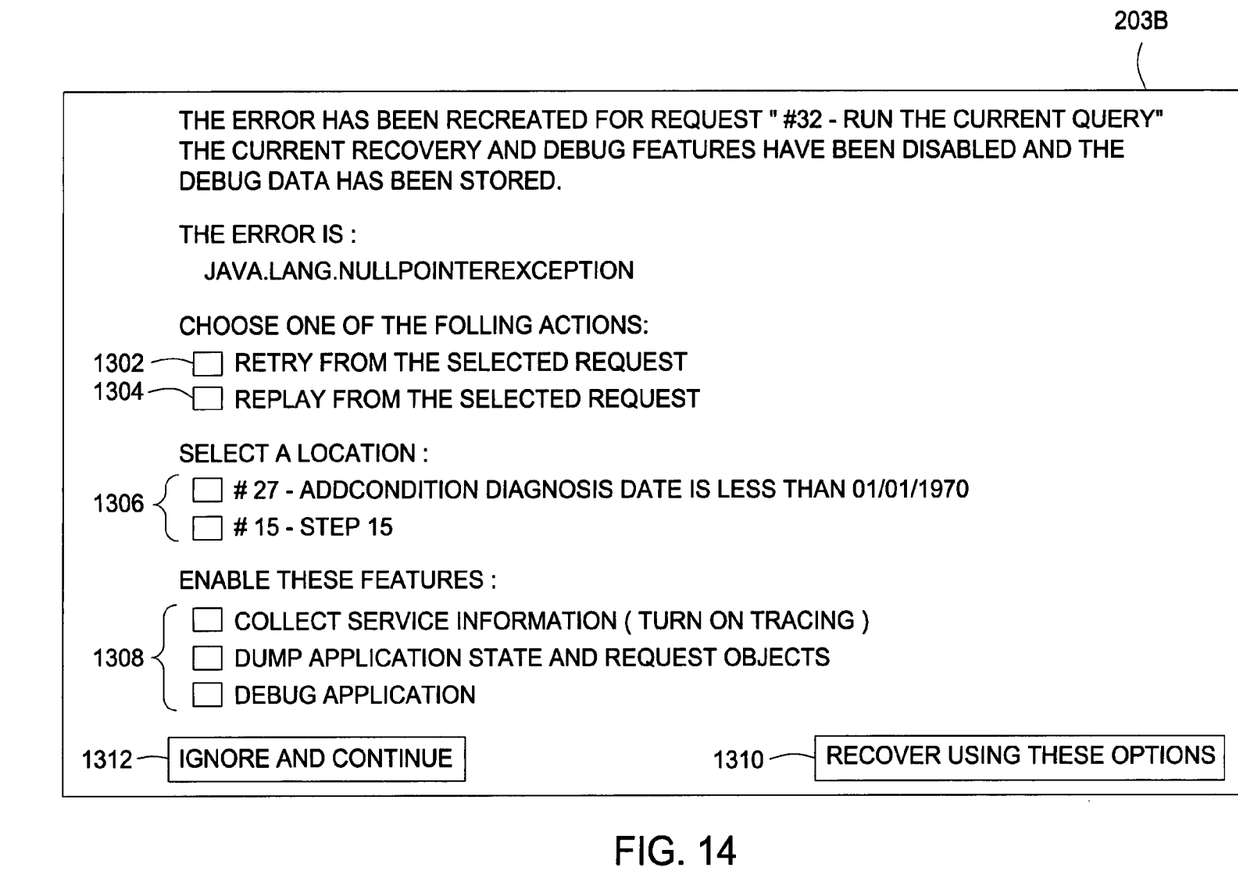
FIG. 14 illustrates an example of an error page for an error that is the result of a retry, according to one embodiment of the invention.

If the error being addressed in an error page is the result of a retry, the user is presented with an error page 203B such as the one shown in FIG. 14. In general, the layout and content of the error page 203B is substantially similar to that of the error page 203A shown on FIG. 13. Some differences include an error message indicating that the error was "recreated" and a message that current recovery and debug features have been disabled (see step 1204). Note also that request No. 1 is no longer available for selection since that request was used to recreate the problem during the retry.

In any case, the user makes his/her selections and submits them for processing. Upon receiving the user's selections (step 1214), the error handler determines whether the user clicked the "Ignore and continue" button 1312 (step 1216). If so, the error handler returns to the service request function. If not, the error handler determines whether the user selected optional debugging functions (step 1218). If so, the error handler performs each selected debug function (steps 1220 and 1222). Otherwise, the error handler determines whether the user elected to perform retry processing (step 1224). If so, the request thread is notified that it should end (step 1226) and all requests between the terminated request thread and the selected sister thread are discarded (step 1228). In addition, the selected sister thread is notified of retry processing (step 1230), indicating that the notified sister thread is now the request thread. The error handler then returns to the service request function.

If the user did not select retry processing, the error handler determines whether the user elected to perform replay processing (step 1234). If not, the error handler returns to the service request function. If replay processing was selected, the error handler notifies the request thread that it should end (step 1336); but note that, unlike retry processing, all requests are preserved. Further, the selected sister thread is instructed to perform replay processing and each subsequent sister thread is instructed to perform consume processing (steps 1338 and 1340). Control then returns to the service request function. In particular, processing will return to step 940 of FIG. 9, since step 960 will be answered affirmatively.

While the foregoing is directed to embodiments of the present invention, other and further embodiments of the invention may be devised without departing from the basic scope thereof, which is determined by the claims that follow.

What is claimed is:

1. A computer-implemented method for parallel processing a sequence of requests received by an application server configured to execute a plurality of threads, comprising:

initiating, by the application server, a first thread configured to (i) perform the sequence of requests received from a user interacting with a web-based application and (ii) to maintain state information specific to the first thread, wherein each request, of the sequence, is composed as a uniform resource locater submitted to the web-based application;

initiating, by the application server, a second thread configured to perform the sequence of requests and to maintain state information specific to the second thread;

performing, sequentially, by the first thread, the sequence of requests;

performing, sequentially, by the second thread, the same sequence of requests, wherein the second thread performs requests, of the sequence, previously performed by the first thread a specified number of steps behind first thread and while the first thread continues to execute requests, from the sequence of requests, whereby the first thread and second thread each independently maintain state information regarding results of each request, of the sequence, performed by the first thread and the second thread, respectively;

upon completion of the sequence of requests by the first thread, producing a primary result for the sequence of requests;

subsequently, upon completion of the sequence of requests by the second thread, producing a secondary result for the sequence of requests;

displaying the primary result produced by the first thread; and discarding, without displaying, the secondary result produced by the second thread.

2. The method of claim 1, wherein the results of performing the sequence of requests by the first thread is visible to a user; and wherein the results of performing the sequence of requests by the second thread is transparent to the user.

3. The method of claim 1, further comprising:

upon detecting an error in the results from performing, by the first thread, one of the sequence of requests, terminating the first thread; and performing, by the second thread, at least a portion of the sequence of requests performed by the terminated first thread and not yet performed by the second thread.

4. The method of claim 1, further comprising, upon detecting an error in the results from performing, by the first thread, one of the sequence of requests:
   terminating execution of the first thread; and
   returning to the user an indication of the request being performed by the first thread resulting in the detected error.

5. The method of claim 1, wherein the requests of the sequence are time ordered and processed by each of the first thread and the second thread according to the time order.

6. A computer-implemented method for parallel processing a sequence of requests received by an application server configured to execute a plurality of threads, comprising:

initiating, by the application server, a first thread configured to (i) perform the sequence of requests received from a user interacting with a web-based application and (ii) to maintain state information specific to the first thread, wherein each request, of the sequence, is composed as a uniform resource locater submitted to the web-based application;

initiating, by the application server, a second thread configured to perform the sequence of requests and to maintain state information specific to the second thread;

performing, sequentially, by the first thread, the sequence of requests;

performing, sequentially, by the second thread, the same sequence of requests, wherein the second thread performs requests, of the sequence, previously performed by the first thread a specified number of steps behind first thread and while the first thread continues to execute requests, from the sequence of requests, whereby the first thread and second thread each independently maintain state information regarding results of each request, of the sequence, performed by the first thread and the second thread, respectively; and upon detecting an error in the results from performing, by the first thread, one of the sequence of requests:
   terminating the first thread;
   recovering from the error by executing remaining requests of the sequence by the second thread up to, but not including, the request resulting in the detected error;
   prompting the user to modify the request which resulted in the detected error;
   receiving a modification to the request;
   executing the modified request;
   executing any remaining requests, of the sequence of requests; and
   displaying a final result produced by the second thread from executing (i) the sequence of requests up to, but not including, the request resulting in the detected error, (ii) the modified request and (iii) the remaining requests of the sequence, if any.

7. A computer-implemented method for parallel processing of requests received by an application server configured to execute a plurality of threads, comprising:

receiving a sequence of requests from a user, wherein each request, of the sequence, is composed as a uniform resource locater submitted to the web-based application;

placing the sequence of requests on a queue managed by the application server in a time-ordered manner;

performing, by a first thread managed by the application server, each request, of the sequence, upon being placed on the queue;

performing, by a second thread managed by the application server, at least a portion of the user requests on the queue step-wise with the first thread and N-requests behind the first thread; wherein the first thread and second thread each independently maintain state information regarding results of each request, of the sequence, performed by the first thread and the second thread, respectively;

upon completion of the sequence of requests by the first thread, producing a primary result for the sequence of requests;

subsequently, upon completion of the sequence of requests by the second thread, producing a secondary result for the sequence of requests;

displaying the primary result produced by the first thread; and discarding, without displaying, the secondary result produced by the second thread.

8. The method of claim 7, further comprising:

upon detecting an error in the results from performing, by the first thread, one of the sequence of requests:
   terminating execution of the first thread; and
   returning to the user an indication of the request performed by the first thread which resulted in the detected error.

* * * * *